July 2, 1957     J. E. WOODS     2,797,873
RESILIENT TELESCOPING DIAPHRAGM
Filed Feb. 12, 1952     2 Sheets-Sheet 1

*INVENTOR.*
JOHN E. WOODS
BY
ATTORNEYS

July 2, 1957 J. E. WOODS 2,797,873
RESILIENT TELESCOPING DIAPHRAGM
Filed Feb. 12, 1952 2 Sheets-Sheet 2

*INVENTOR.*
JOHN E. WOODS
BY *Kenway Jenney*
*Witter & Hildreth*
ATTORNEYS

United States Patent Office 2,797,873
Patented July 2, 1957

2,797,873
RESILIENT TELESCOPING DIAPHRAGM

John E. Woods, Cohasset, Mass., assignor to Standard-Thomson Corporation, Boston, Mass., a corporation of Delaware Application February 12, 1952, Serial No. 271,218

7 Claims. (Cl. 236—93)

The present invention comprises a resilient telescoping diaphragm for use with reciprocating rods and pistons.

In some apparatus, of which certain types of thermostats may be taken as an example, a small amount of motion arising from the expansion of a liquid or solid is to be transmitted under great pressure to a reciprocating rod or piston. To seal the piston is a matter of some difficulty since a simple sleeve bearing will allow liquid to pass under the exceptionally high pressures. Various forms of seals have been suggested, but these have generally been unsatisfactory since a simple diaphragm does not provide for adequate motion, and a tubular device may be subjected to ballooning or bursting under high pressures.

The object of the present invention is to provide a telescoping diaphragm which will allow considerable motion of the reciprocating member, while being able to withstand exceptionally high pressures without damage.

With the foregoing object in view, the principal feature of the present invention comprises a flexible and resilient diaphragm member cooperating with a piston and completely enclosed or confined in a sleeve, whereby all parts of the diaphragm are backed up by solid parts to resist bursting pressures and to prevent creasing or tearing at the folds.

Figure 1:
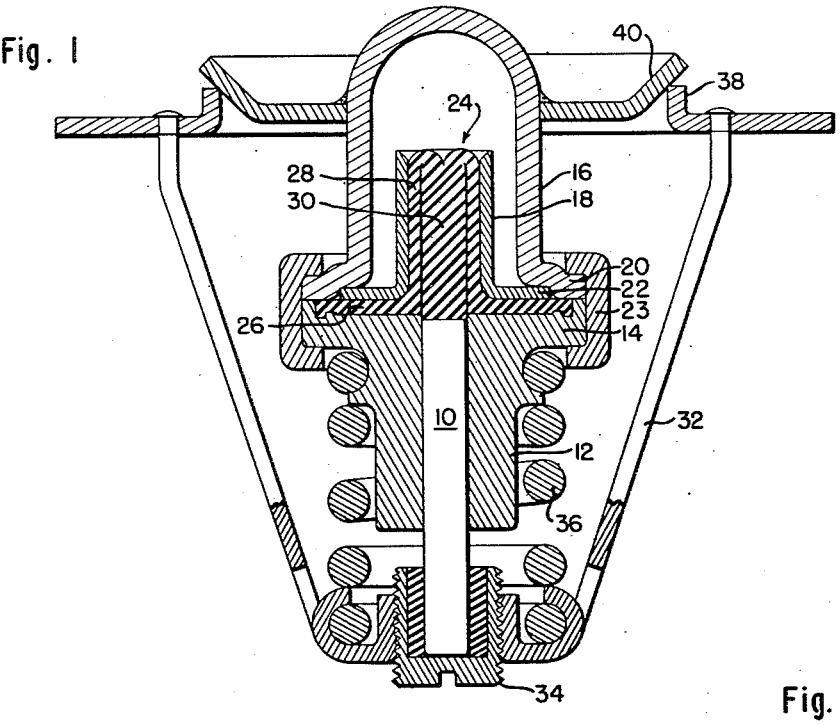
Figure 3:
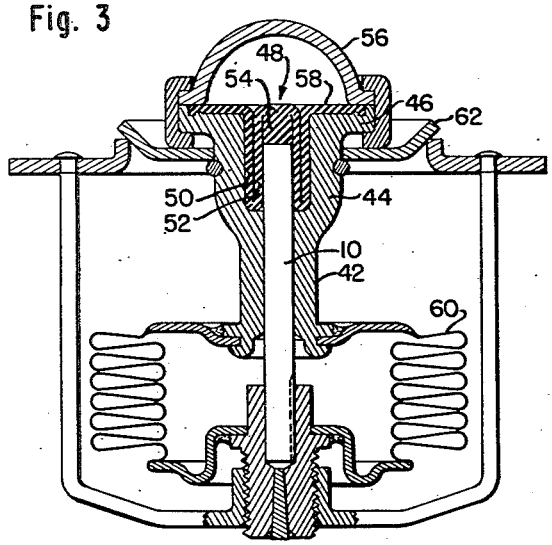
Figure 2:
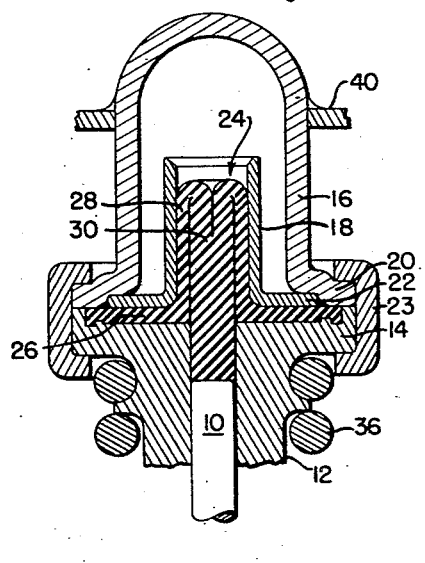
Figure 4:
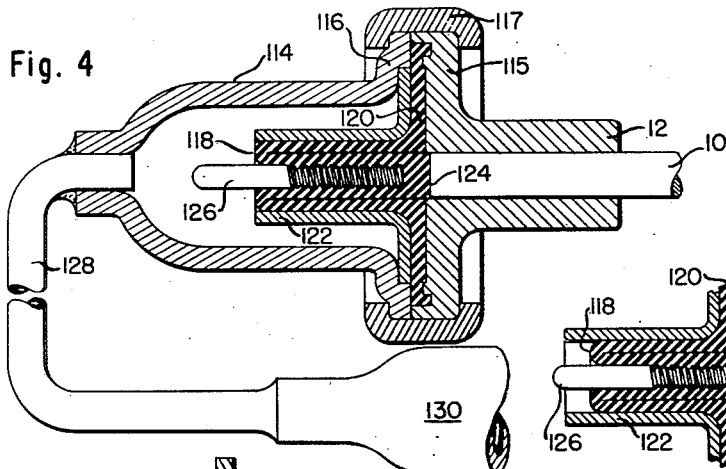
Figure 5:
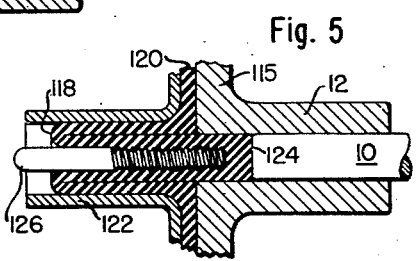
Figure 6:
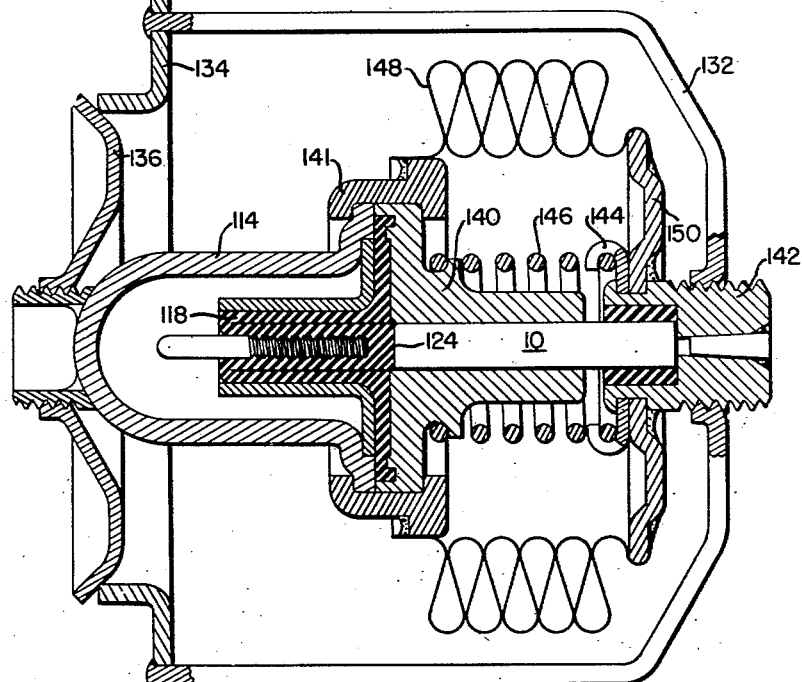
Figure 7:
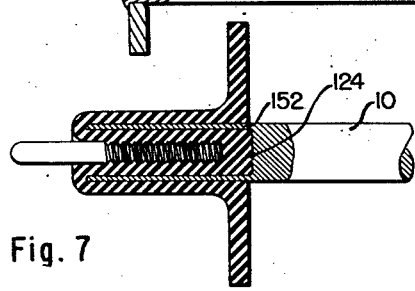

In the accompanying drawings Fig. 1 is a sectional elevation of one form of thermostatic device according to the present invention; Fig. 2 is a sectional elevation of a part of the device of Fig. 1, showing the manner of folding the diaphragm member; Fig. 3 is a sectional elevation of a modified form of the invention; Fig. 4 is an elevation in section of another modified form of thermostatic device shown connected with a capillary and bulb; Fig. 5 is a detail of the diaphragm in a different position; Fig. 6 is a sectional elevation of a valve embodying the invention; and Fig. 7 is a sectional view of a further modified form of the invention.

One form of the invention is shown in Fig. 1. It comprises a reciprocating piston 10 arranged to slide in the sleeve bearing 12. The bearing is formed with a flange 14, a cup member 16 and a tube 18 having flanges 20 and 22 respectively secured to the flange 14 by a retaining ring 23, thus forming an integral casing. The interior of the cup 16 is filled with liquid or a waxy solid as in the use of the device of the thermostat.

Secured between the casing and the piston is a diaphragm member 24 which is normally of the shape indicated in Fig. 1. The member has a flange 26 which is tightly gripped between the flanges 14 and 22. Extending from the flange and within the tube 18 the member has an outer fold 28. The outer fold terminates in an inner plug-like portion 30, the end of which bears against the end of the piston 10. The members preferably are synthetic rubber of the type designated "hycar" which has been found capable of undergoing a substantial number of deformations without damage and without danger of sticking to itself or to the metal parts.

In operation, upon expansion of the liquid or wax within the receptacle 16 the piston is moved outwardly as shown in Fig. 2. During this motion the fold 28 and the plug 30 are entirely confined within the tube 18. It will be observed that the radius of the plug member is greater than the thickness of the fold 28. As the outer fold telescopes inwardly to accommodate the motion, it enlarges in thickness, because any section across the tube 18 is at all times taken up either by the material at the center or that remaining in the outer fold. This follows from the fact that the rubber is not substantially compressible but is capable of deformation whereby it changes in length and thickness to accommodate itself to the shape of the tube 18. It will be observed that the folds are completely confined by the tube 18 and further that there is no creasing or folding which might lead to tearing of the rubber.

As shown in Fig. 1, the invention is embodied in a valve. To this end there is provided a frame 32 having a portion 34 to engage the end of the piston. A tension spring 36 connects between the end of the frame and the flange 14. The frame is provided with a valve seat 38 and a valve member 40 is welded or otherwise secured to the cup 16. In the description thus far given, it is assumed that the cup 16 is stationary and the piston 10 is moved. However, the frame and valve seat may be stationary while the valve member 40 is movable, so long as the parts are capable of movement relative to each other.

The device shown in Fig. 3 comprises a modification of the invention. The piston 10 is enclosed in a sleeve-bearing member 42 having an end portion 44 terminating in a flange 46. The diaphragm member 48 is similar to the member 24 except that it has an additional outer fold 50. It has an inner fold 52 corresponding to the fold 28 of Fig. 1 and this inner fold terminates in a plug member 54. The two folds 50 and 52 are closely confined within a relieved groove of the end portion 44 of the sleeve member. The plug member is preferably shorter than in Fig. 1 and the piston 10 is received within the inner fold 52 to bear against the plug member at the bottom. There is a cup 56 suitably secured to the member 44, the diaphragm member having a flange 58 identical with the flange 26 of Fig. 1.

In operation, upon expansion of the material in the cup 56, the plug 54 is pushed against the piston and the inner fold 52 telescopes inwardly in exactly the same manner as in Fig. 1. The outer fold 50 remains stationary and serves only as a means of connecting the outer end of the fold 52 with the flange. As in Fig. 1, the cross-sectional area of the inner fold 52 equals the cross-sectional area of the plug whereby the space behind the piston is completely filled. This construction avoids the use of the tube 18 and is accordingly considered preferable, especially when wax is used as the thermostatic medium, since the cup 56 can be readily filled with the waxy material. In the construction of Fig. 1, the cup 16 is more difficult to fill.

Fig. 3 also illustrates a modified construction of valve wherein there is substituted for the spring 36 an evacuated bellows 60 connected between the frame and the bearing member 42. The evacuated bellows acts in the manner of a tension spring to normally urge the valve member 62 toward its seat and it further serves as a seal to protect the piston and sleeve against entry of liquid. This type of thermostat is especially suitable as a water control to be immersed in a circulating water system of an internal combustion engine, the piston and bearing being protected by the bellows from fouling by the water. The device has the advantage of failing safe since if the bellows 60 is punctured, its tension effect is lost and the valve opens.

Although the invention previously described is embodied in a thermostatically controlled valve, the invention is not limited to valves but may be applied to any temperature or pressure-controlled device. Furthermore, a tube may be connected to the cup 56 to transmit pressure from a more remote source.

The forms of the invention shown in Figs. 4 to 7 are similar to those previously described, except that they involve the use of an internal pin for supporting the folds of the telescoping diaphragm. These constructions will now be described in detail.

In Fig. 4 the reciprocating piston 10 is arranged to slide in the sleeve bearing 12. The bearing member 12 is secured to a cup member 114. The bearing member and cup member have opposed flange portions 115 and 116, arranged to be held together by a securing ring 117.

Secured between the flange portions 115 and 116 is a flexible telescoping diaphragm member 118 which is normally of the shape indicated in Fig. 4. The member has at its outer end a flange 120 which is tightly gripped by the flanges 115 and 116. A flanged tube 122 which is retained by the flanges 115 and 116, serves to confine the tubular portions of the member 118. As shown in Fig. 4, the member has two such tubular portions, namely, an outer portion confined within the wall of the tube, and an inner portion terminating in an end wall 124 which abuts the end of the piston 10. A metal pin or rod member 126 is secured in the inner tubular portion of the seal. The rubber diaphragm is preferably vulcanized with the pin in place, and the pin is threaded or knurled to secure it in place.

It will be observed that a cup-shaped chamber is formed by the member 114, and the pin 126 projects into the cup. The cup serves as a receptacle completely filled with a liquid or waxy solid. Alternatively, the cup may be connected, as actually shown in Fig. 4, with a capillary 128 which has at its end a thermostatic bulb 130, in which case the casing, capillary and bulb are all completely filled with liquid, whereby the rod 10 will respond to changes in volume of the liquid due to changes in temperature.

As in the construction of Fig. 1, the tubular portions of the diaphragm member are completely confined and supported, externally by the wall of the tube 122 and internally by the pin or rod 126, and are not subjected to any bursting pressure. The closed end portion 124 of the member lies against the bottom end of the piston and is firmly held in contact therewith by the pressure of the liquid. To accommodate the change in length required for motion of the piston, the member folds inwardly in a manner indicated in Fig. 5. These folds are supported by the rod 126.

It will be understood that the piston is ordinarily spring-loaded, whereby upon a reduction of pressure, as the thermostatic material (wax or liquid) contracts, the piston is pushed back toward the position of Fig. 4. The diaphragm is compelled to telescope in folds in orderly fashion, as shown in Fig. 5, hence the liquid or wax cannot get behind the folds, and no irregular creases can form which might result in tearing during the inward movement of the piston.

The use of the invention in a valve is shown in Fig. 6. The valve comprises an outer frame 132 carrying a valve seat 134. A movable valve member 136 cooperates with the seat. The valve member is connected to the cup member 114, which is filled with a suitable thermostatic liquid or solid. The member 118 is as in Fig. 4 and is arranged to act on the piston rod 10. The member is confined between the cup member 114 and a flanged member 140, which is similar to the sleeve bearing member 12. A securing ring 141, similar to the ring 117, is provided.

The outer end of the piston 10 bears against an abutment 142 which is in the form of a plug member supported in the frame. Secured to the plug member 142 is spring retainer 144. A tension spring 146 is secured between the retainer and the bearing member 140, whereby the valve is urged toward closed position.

The bearing member 140 is preferably enclosed by a bellows 148 secured between the ring 141 and a head 150, which latter is conveniently mounted on the plug member 142. The bellows is preferably evacuated, in which case it acts in tension between the parts 141 and 150, so that the spring 146 may be unnecessary. In small units, the bellows may not be large enough to exert sufficient tension, and the spring 146 may be used to augment the action of the bellows. The device has the advantage of "failing safe," since if the bellows 148 is punctured, its tension effect is lost, and the valve tends to open.

In Fig. 7 is shown a modified assembly in which a thin metal sleeve 152 is formed at the end of the piston 10. The sleeve is received between the inner and outer folds of the flexible diaphragm member when the latter is in its extended position. Upon expansion of the thermostatic material, the piston is moved to the right in the same manner as previously described. The principal purpose of the sleeve is to prevent any interference as the end portion 124 enters the sleeve 12. It also serves to diminish friction between the inner and outer folds of the diaphragm member.

As actually shown in the drawings, the inner and outer folds are of equal thicknesses in Figs. 4 to 7. Actually the inner folds will be somewhat thicker than the outer folds for the reasons previously given in connection with Figs. 1 to 3. However, because of the space taken up by the pin, the inner and outer folds present less differences in thickness than in Figs. 1 to 3, and the differences are not emphasized in Figs. 4 to 7.

In the constructions of Figs. 3 and 6, which include an evacuated bellows, a small quantity of vaporizable liquid may be introduced into the bellows prior to sealing. The liquid is of such boiling point and is present in such amount that a vacuum is maintained in the bellows throughout the normal range of operation, and until a temperature somewhat in excess of the normal opening temperature is attained. Thus, if the normal opening temperature is 160° F., the bellows will be under vacuum until a water temperature of 170° F. is attained, above which temperature the pressure is above atmosphere. (Generally a few drops of liquid will suffice.) This has no effect on the normal operation of the valve under the influence of the thermostatic material in the cup 56 (or 114), but is a safety feature, whereby if the resilient telescoping diaphragm ruptures or otherwise fails, the pressure in the bellows will cause the valve to open at a temperature slightly above normal. This feature is especially useful in automotive water controls to protect the engine from overheating.

In any of the embodiments herein described, one of the principal features is that all parts of the diaphragm member are subjected to compressive stresses at all times. The pressures attained in a unit completely filled with liquid or wax are frequently in excess of 500 pounds per square inch, and since the wall thickness of the rubber may be about $\frac{1}{32}''$, it is clear that tensile stresses would act to rupture the walls. According to the present invention, not only is every part of the member confined, but all portions thereof are under compression under all conditions. Since the rubber material is practically incompressible, the telescoping motions of the folds are accompanied by plastic deformation. Under such conditions it is important that there be no voids which need to be filled as the pressure is increased; in other words, the material should not be required to increase in volume under increasing pressure, since to do so would result in placing a part of the diaphragm member under tension.

Having thus described my invention, I claim:

1. A thermostatic valve comprising a frame having a valve seat and a movable valve member, the valve member having a casing forming a chamber for thermostatic material, said casing having a sleeve bearing and an annular wall portion coaxial with and of larger diameter than said bearing, a rod slidably received in the bearing and secured at its outer end to the frame, spring means comprising an evacuated bellows engageable at one end with the frame and at the other end with the casing and acting in tension to urge the valve member against the seat, and a tubular diaphragm member having a closed end abutting said rod and an outwardly folded portion confined within said annular wall portion and secured at its extremity to the casing, said diaphragm member being arranged to fold within itself upon motion of said rod relative to the casing with said outwardly folded portion remaining fully confined by said annular wall portion.

2. A thermostatic valve comprising a frame having a valve seat and a movable valve member, the valve member having a casing forming a chamber for thermostatic material, said casing having a sleeve bearing and an annular wall portion coaxial with and of larger diameter than said bearing, a rod slidably received in the bearing and secured at its outer end to the frame, spring means comprising an evacuated bellows engageable at one end with the frame and at the other end with the casing and acting in tension to urge the valve member against the seat, and a tubular diaphragm member having a closed end abutting said rod and an outwardly folded portion confined within said annular wall portion and secured at its extremity to the casing, said diaphragm member being arranged to fold within itself upon motion of said rod relative to the casing with said outwardly folded portion remaining fully confined by said annular wall portion, said bellows containing a small quantity of vaporizable liquid operable to generate a pressure in the bellows to apply an opening force to the valve at a temperature in excess of the opening temperature under the influence of said thermostatic material.

3. The combination with a casing having a sleeve bearing and a relatively reciprocating element therein, of a tubular diaphragm member having a closed end abutting one end of said element and an outwardly folded portion confined within said casing, said diaphragm member being arranged to fold within itself upon motion of said element, and a closed evacuated bellows having one end engageable with the other end of said element and the other end engageable with the casing.

4. The combination with a casing having a sleeve bearing and a relatively reciprocating element therein, of a tubular diaphragm member having a closed end abutting one end of said element and an outwardly folded portion confined within said casing, said diaphragm member being arranged to fold within itself upon motion of said element, a closed evacuated bellows having one end engageable with the other end of said element and the other end engageable with the casing, and thermostatic means operating through the diaphragm member on the reciprocating element, said bellows containing a small quantity of vaporizable liquid to generate an internal pressure to operate said reciprocating element at a temperature in excess of the operating temperature under the influence of said thermostatic means.

5. An actuator having, in combination, a casing to be filled with a pressure transmitting material and having a sleeve bearing and an annular wall portion coaxial with and of larger diameter than said bearing, an element slidably received in the bearing, and a tubular diaphragm member having a closed end abutting said element, an inner tubular portion adjacent said end and an outer tubular portion folded over said inner portion and supported substantially throughout its length by said wall portion, said diaphragm member being arranged so that upon sliding of said element outwardly from the casing said inner portion folds inwardly upon itself and supports itself internally substantially throughout the length thereof while said outer portion supports said inner portion externally.

6. A thermostatic valve comprising a frame having a valve seat and a movable valve member, the valve member having a casing forming a chamber for thermostatic material, said casing having a sleeve bearing and an annular wall portion coaxial with and of larger diameter than said bearing, a rod slidably received in the bearing and secured at its outer end to the frame, spring means to urge the valve member against the seat, and a tubular diaphragm member having a closed end abutting said element, an inner tubular portion adjacent said end and an outer tubular portion folded over said inner portion and supported substantially throughout its length by said wall portion, said diaphragm member being arranged so that upon sliding of said element outwardly from the casing said inner portion folds inwardly upon itself and supports itself internally substantially throughout the length thereof while said outer portion supports said inner portion externally.

7. An actuator having, in combination, a casing to be filled with a pressure transmitting material and having a sleeve bearing and an annular wall portion coaxial with and of larger diameter than said bearing, an element slidably received in the bearing, a tubular diaphragm member having a closed end abutting said element, an inner tubular portion adjacent said end and an outer tubular portion folded over said inner portion and supported substantially throughout its length by said wall portion, and a supporting rod member abutting said end and supporting said inner portion internally substantially throughout its length, said diaphragm member being arranged so that upon sliding of said element outwardly from the casing said inner portion folds inwardly upon said supporting rod member while said outer portion supports said inner portion externally.

References Cited in the file of this patent

UNITED STATES PATENTS

| | | |
|---|---|---|
| 1,964,745 | Sauzedde | July 3, 1934 |
| 2,044,127 | Smith | June 16, 1936 |
| 2,310,519 | Eskin | Feb. 9, 1943 |
| 2,356,958 | Van Wangenheim | Aug. 29, 1944 |
| 2,471,514 | Branson | May 31, 1949 |
| 2,507,466 | Craene | May 9, 1950 |
| 2,534,251 | Dillman | Dec. 19, 1950 |
| 2,612,419 | Reynolds | Sept. 30, 1952 |

FOREIGN PATENTS

| | | |
|---|---|---|
| 10,254 | Great Britain | Nov. 22, 1933 |
| 600,610 | France | Nov. 14, 1925 |